(12) United States Patent
Leonhardt et al.

(10) Patent No.: US 11,747,857 B2
(45) Date of Patent: Sep. 5, 2023

(54) WEARABLE SECURITY DEVICE AND CHARGING BAND, SYSTEM AND METHOD

(71) Applicant: Futurisks, LLC, Macclesfield, NC (US)

(72) Inventors: Gary Leonhardt, Macclesfield, NC (US); Jon Buttram, Raleigh, NC (US); Akash Ganapathi, Apex, NC (US); Peter Seymour, Greenville, NC (US)

(73) Assignee: Futurisks, LLC, Macclesfield, NC (US)

( * ) Notice: Subject to any disclaimer, the term of this patent is extended or adjusted under 35 U.S.C. 154(b) by 45 days.

(21) Appl. No.: 17/337,353

(22) Filed: Jun. 2, 2021

(65) Prior Publication Data

US 2021/0373594 A1    Dec. 2, 2021

Related U.S. Application Data

(60) Provisional application No. 63/033,213, filed on Jun. 2, 2020, provisional application No. 63/033,211, filed on Jun. 2, 2020.

(51) Int. Cl.
*G06F 1/16* (2006.01)
*H02J 50/10* (2016.01)
(Continued)

(52) U.S. Cl.
CPC ............... *G06F 1/163* (2013.01); *G06F 1/26* (2013.01); *H02J 50/005* (2020.01); *H02J 50/10* (2016.02)

(58) Field of Classification Search
CPC . G06F 1/163; G06F 1/16; G04B 37/14; H02J 50/005; H02J 50/10
See application file for complete search history.

(56) References Cited

U.S. PATENT DOCUMENTS

| 4,284,849 A | 8/1981 | Anderson et al. |
| 4,918,717 A | 4/1990 | Bissonnette et al. |

(Continued)

FOREIGN PATENT DOCUMENTS

| CA | 2728834 C | 12/2009 |
| CA | 2831996 C | 10/2012 |

(Continued)

OTHER PUBLICATIONS

Delahoz et al., "Survey on Fall Detection and Fall Prevention Using Wearable and External Sensors", Sensors, 2014, vol. 14, pp. 19806-19842.

(Continued)

*Primary Examiner* — Dedei K Hammond
*Assistant Examiner* — Bryan Van Huynh
(74) *Attorney, Agent, or Firm* — Michael Best & Friedrich LLP

(57) ABSTRACT

A wearable device for securely remaining coupled to a user and recording data pertaining to the user is provided. The device includes a main body, which has a display for viewing, a magnet for aligning the main body to other objects, a rechargeable battery for powering the main body and a computing module for storing, transferring and analyzing data. The device also includes a band extending from a first end of the main body to a second end of the main body for permitting coupling of the device to a user. The band may include anti-tampering features for preventing uncoupling of the device from a user without detection. The wearable device includes a charger to be worn adjacent to the device for wirelessly charging.

12 Claims, 16 Drawing Sheets

(51) Int. Cl.
*H02J 50/00* (2016.01)
*G06F 1/26* (2006.01)

(56) References Cited

U.S. PATENT DOCUMENTS

| | | | |
|---|---|---|---|
| 5,027,383 A | 7/1991 | Sheffer | |
| 5,195,126 A | 3/1993 | Carrier et al. | |
| 5,225,997 A | 7/1993 | Lederer et al. | |
| 5,305,370 A | 4/1994 | Kearns et al. | |
| 5,479,482 A | 12/1995 | Grimes | |
| 5,673,304 A | 9/1997 | Conner et al. | |
| 5,923,731 A | 7/1999 | McClure | |
| 6,049,272 A | 4/2000 | Lee et al. | |
| 7,633,263 B2 * | 12/2009 | Toya | H02J 7/0044 |
| | | | 320/108 |
| 8,059,105 B2 | 11/2011 | Rosenberg et al. | |
| 8,116,724 B2 | 2/2012 | Peabody | |
| 8,351,299 B2 | 1/2013 | Cohen et al. | |
| 8,441,353 B2 | 5/2013 | Williams, Sr. et al. | |
| 8,466,794 B2 | 6/2013 | Mack et al. | |
| 8,638,301 B2 | 1/2014 | Birnbaum et al. | |
| 8,684,922 B2 | 4/2014 | Tran | |
| 8,933,803 B2 | 1/2015 | Sharma et al. | |
| 9,462,135 B2 | 10/2016 | Smith et al. | |
| 9,553,616 B2 | 1/2017 | McCormack et al. | |
| 9,900,669 B2 | 2/2018 | Touma et al. | |
| 9,990,831 B2 | 6/2018 | Keyton | |
| 10,109,173 B2 | 10/2018 | Keyton | |
| 10,255,789 B2 | 4/2019 | Keyton | |
| 10,455,085 B1 | 10/2019 | Roundy et al. | |
| 10,474,192 B2 | 11/2019 | Song et al. | |
| 10,515,536 B2 | 12/2019 | Grundstrom | |
| 10,546,657 B2 | 1/2020 | Leonhardt et al. | |
| 10,849,392 B1 | 12/2020 | Wittenberg et al. | |
| 2007/0082651 A1 | 4/2007 | Loizeaux | |
| 2009/0319230 A1 | 12/2009 | Case, Jr. et al. | |
| 2011/0181418 A1 | 7/2011 | Mack et al. | |
| 2011/0245633 A1 | 10/2011 | Goldberg et al. | |
| 2013/0148790 A1 | 6/2013 | McGary et al. | |
| 2014/0329491 A1 | 11/2014 | Scott | |
| 2015/0185764 A1 * | 7/2015 | Magi | G06F 1/163 |
| | | | 361/679.03 |
| 2018/0013947 A1 * | 1/2018 | Kim | G06F 13/14 |
| 2020/0000351 A1 * | 1/2020 | Rauhala | A61B 5/6831 |

FOREIGN PATENT DOCUMENTS

| | | | | |
|---|---|---|---|---|
| CN | 102982653 A | | 3/2013 | |
| EP | 0738065 A1 | | 10/1996 | |
| KR | 20170140962 A | * | 12/2017 | G04C 10/00 |
| WO | 2008116284 A1 | | 10/2008 | |
| WO | 2015019360 A1 | | 2/2015 | |
| WO | 2016110804 A1 | | 7/2016 | |
| WO | WO-2019143106 A1 | * | 7/2019 | G04C 10/00 |

OTHER PUBLICATIONS

Hospimedica, "Innovative Smartband Predicts Pending Epileptic Seizures", <https://www.hospimedica.com/health-it/articles/294776586/innovative-smartband-predicts-pending-epileptic-seizures.html>, Jan. 2019, 5 pages.

Pyzyk, "Tech can impact domestic violence—not always in a positive way", SmartcitiesDive, <https://www.smartcitiesdive.com/news/tech-can-impact-domestic-violence-not-always-in-a-positive-way/555757/>, May 2019, 8 pages.

Ren et al., "High-performance wearable thermoelectric generator with self-healing, recycling, and Lego-like reconfiguring capabilities", Science Advances, 2021, vol. 7, pp. 1-8.

Yang et al., "A Review of Accelerometry-Based Wearable Motion Detectors for Physical Activity Monitoring", Sensors, 2010, vol. 10, pp. 7772-7788.

AliExpress, "New 4 in 1 Emergecy Power Bank Lighter BRacelet Charger Cable for iPhone 5 5S 6 Plus Samsung / HTC / Sony / Moto / LG / Nokia", <https://ar.aliexpress.com/item/2251832333105599.html?gatewayAdapt=4itemAdapt>, available online at least prior to Jun. 2020, 17 pages.

* cited by examiner

WEARABLE SECURITY DEVICE AND CHARGING BAND, SYSTEM AND METHOD

TECHNICAL FIELD

The presently disclosed subject matter is directed towards a wearable security device. Specifically, the device may include a rechargeable battery, data collection and anti-tampering security features for assisting a user and/or the monitoring entity. Further, a charger may be included for charging the device and having a rechargeable battery, wireless transmission coil and magnets for aligning the device to the charge for charging.

BACKGROUND

Violence and domestic abuse is a pervasive problem. Protecting victims from future abuse requires innovative solutions. There have been a number of software applications and other digital solutions that have focused on passing along helpful information and resources to victims. Further, the prior art includes a number of wearable devices permitting a victim to manually signal for assistance when confronted by an abuser or potential threat. While these innovations are useful, they require action by the victim, who may be disinclined to act, or may be prevented from acting. It is well known that victims of domestic violence are often deterred from taking action by their abuser, whether from fear, manipulation or physical detainment. Accordingly, there remains a need for a device, system and method of use that addresses the various disadvantages associated with currently victim-assisting technology. Specifically, secure and automatic detection of threats and harm should be made available to victims so that assistance cannot be prevented by the abuser.

Devices to be worn on the body are becoming ubiquitous. These devices require power to function and charging the devices typically requires removing the device or for the user to remain stationary while the device is being worn. For many users, the temporary functional unavailability, the repeated removing/reattachment wears down both the device and patience of the user, as well as risks the device being lost. There have been a number of innovative solutions that have focused on charging a device while being worn, but they typically obstruct the user's full use of their hands, feet or body. Accordingly, there remains a need for a charger, system and method of use that addresses the various disadvantages associated with current devices being worn and the methods for charging them. Specifically, a charger which can charge a device while being worn, without inconveniencing the wearer is herein provided. The charge may be used to ensure the victim's device described herein remains charged while being worn by the victim.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a wearable device is provided. The device includes an a main body defining a first end opposite a second end, an interior surface opposite an exterior surface and both extending between the first end and the second end; a display positioned on the exterior surface; at least one magnet positioned on a side surface extending between the first end, the second end, the interior surface and the exterior surface; at least one battery positioned proximal the at least one magnet and housed within the main body; a computing module housed within the main body, wherein the computing module includes a processor and memory; a band configured to extend from the first end to the second end for defining a void between the interior surface and the band; a durable cable, fiber optic cable and/or delicate breakable metal circuitry housed within the band and extending across an entire length of the band.

According to at least another embodiment of the disclosed subject matter, a wearable charger is provided. The charger includes a main body defining a first end opposite a second end, an interior surface opposite an exterior surface and both extending between the first end and the second end, and one or more side surfaces extending between the first end, the second end, the interior surface and the exterior surface; a display positioned on one of the surface of the main body; at least one magnet positioned on one of the surfaces of the main body; at least one battery positioned within the main body; a male band extending from the first end; a female band extending from the second end for selectively engaging with the male band or a flexible open-ended band with return shape memory allowing for quick and easy attachment and/or removal.

BRIEF DESCRIPTION OF THE DRAWINGS

The foregoing, as well as the following Detailed Description of preferred embodiments, is better understood when read in conjunction with the drawings included herein. For the purposes of illustration, there is shown in the drawings exemplary embodiments; however, the presently disclosed subject matter is not limited to the specific methods and instrumentalities disclosed.

DETAILED DESCRIPTION

Figure 1A:
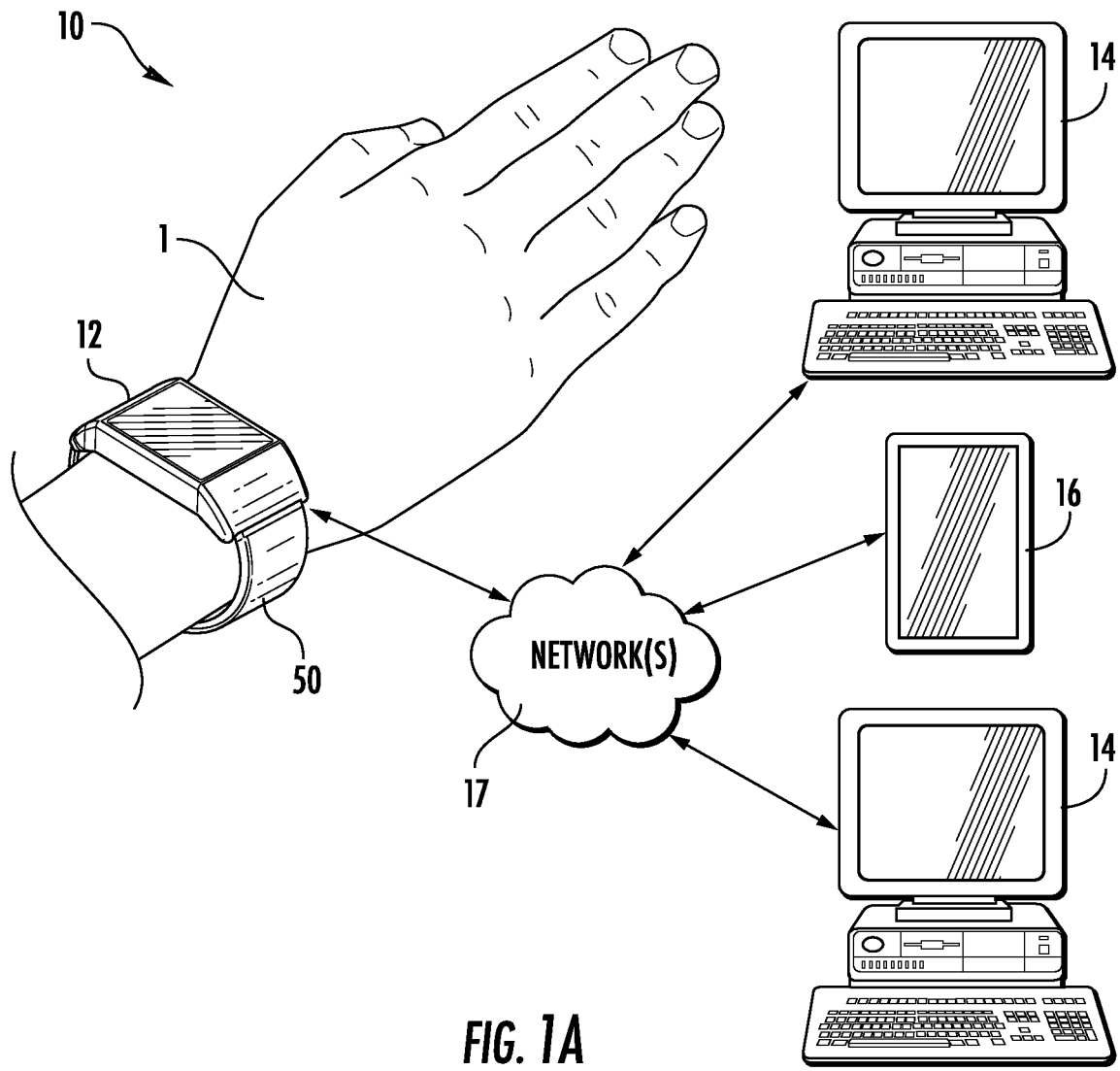
FIG. 1A is a schematic view of an embodiment of a victim security system that includes a security device and remote computer devices that can communicate via one or more networks according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

A victim security system 10 of the present invention may include a wearable device 12 and a remote computer 14 as shown, for example, in FIG. 1A. For example, the victim security system can include a wearable security device 12 and one or more remote computing devices 14, 16. The wearable security device 12 and remote computing devices 14, 16 can communicate via one or more networks 17. The system may further include a charging system 100, as described herein with reference to FIGS. 12-17. The device 12 and computer 14 may be configured to communicate with each other using any methods know in the prior art and/or disclosed herewithin. The device 12 may be worn by a user 1 for detecting conditions for storage and/or analyzation by the device 12 and/or computer 14. For example, in at least one embodiment of the invention, the device 12 may detect a violent act, undesirable tampering of the device 12, a voice command, or a gunshot and communicate such condition to the computer 14 for subsequent action, such as alerting authorities or checking in with the user.

Figure 1B:
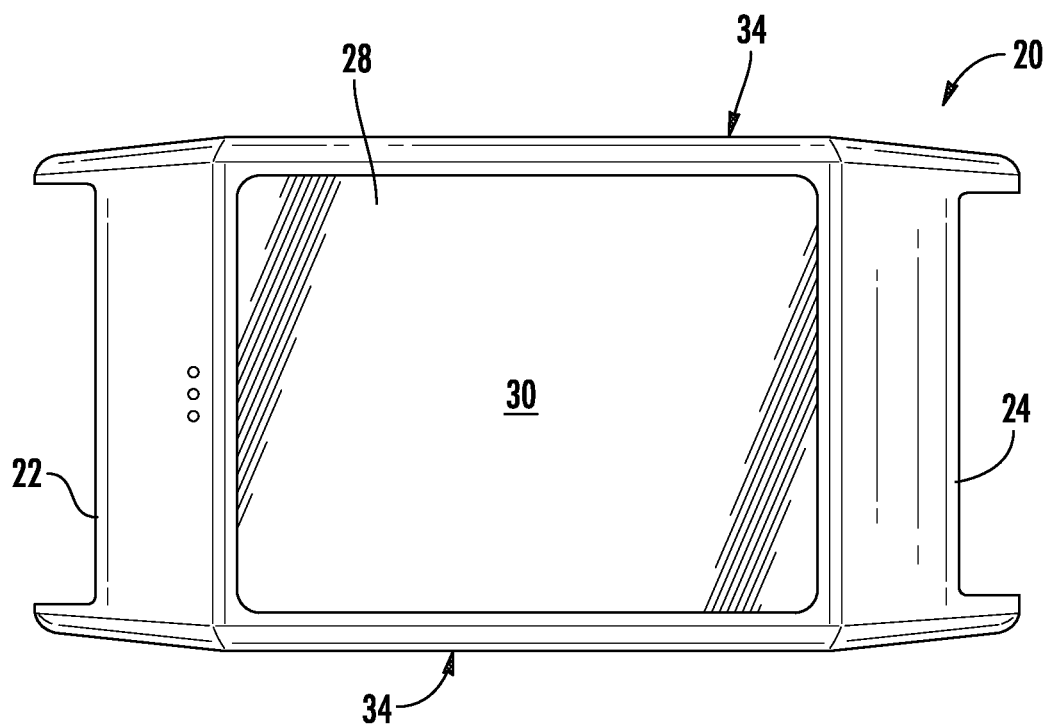
FIG. 1B is a top view of the display of the main body according to one or more embodiments of the presently disclosed subject matter.
Figure 2:
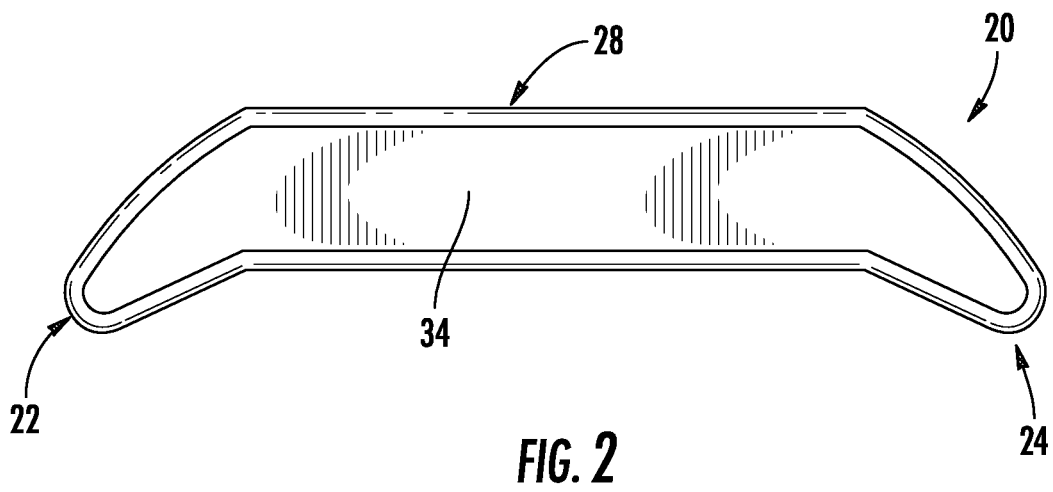
FIG. 2 is a side view of the display of the main body according to one or more embodiments of the presently disclosed subject matter.

In some embodiments, the device 12 includes a main body 20 coupled to a band 50. The main body 20 may define a first end 22 opposite a second end 24, an interior surface 26 opposite an exterior surface 28, wherein the surfaces 26, 28 extend between the first end 22 and the second end 24. Further, the main body 20 may define at least one side 34 extending between the two ends 22, 24 and the two surfaces 26, 28. FIGS. 1B and 2 depict a shape and configuration of the main body 20 according to one embodiment of the invention.

The main body 20 may include a display 30 for displaying information. The display 30 may also include one or more inputs for receiving commands from the user 1. The input(s) may be a button, haptic surface, or some other tactile feature. The display 30 may be positioned on the exterior surface 28 for viewing by the user 1 (e.g., see FIGS. 1B and 2).

Figure 3:
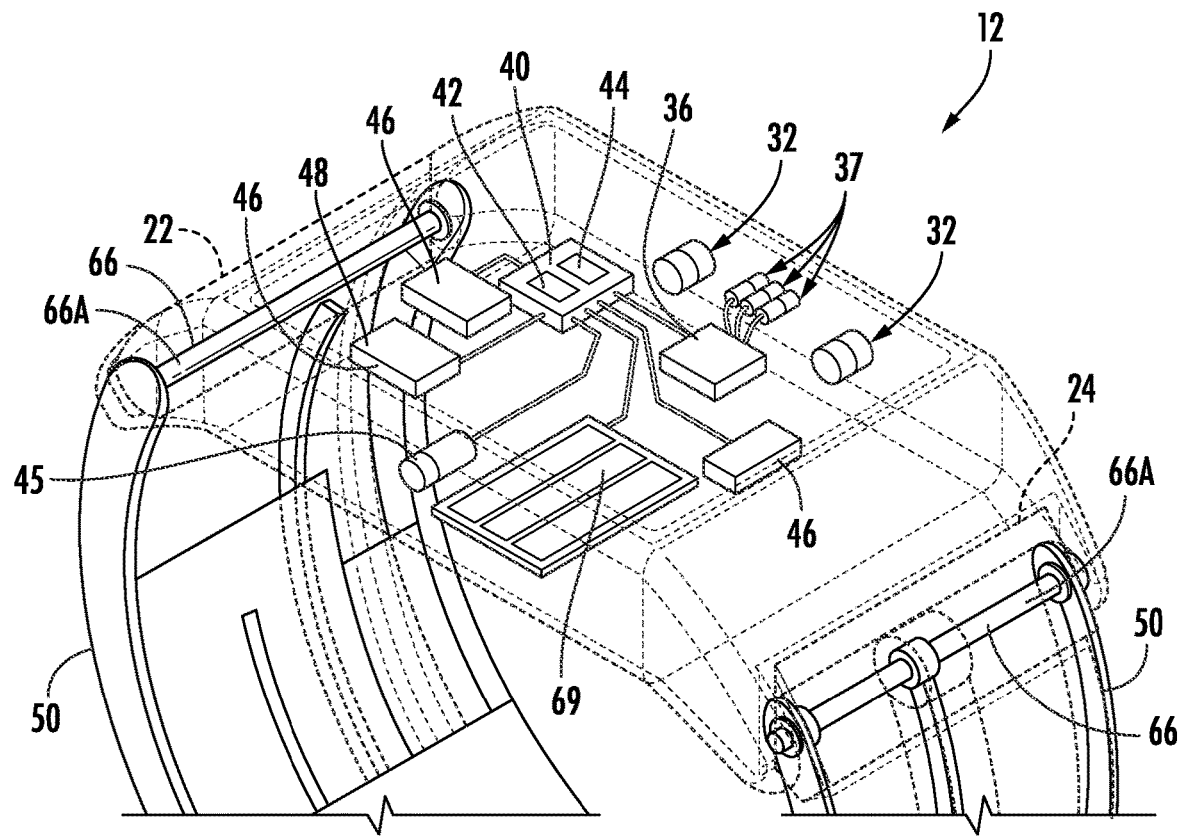
FIG. 3 is a perspective view of an interior schematic of the main body having magnets, pins and a computer module according to one or more embodiments of the presently disclosed subject matter.
Figure 7:
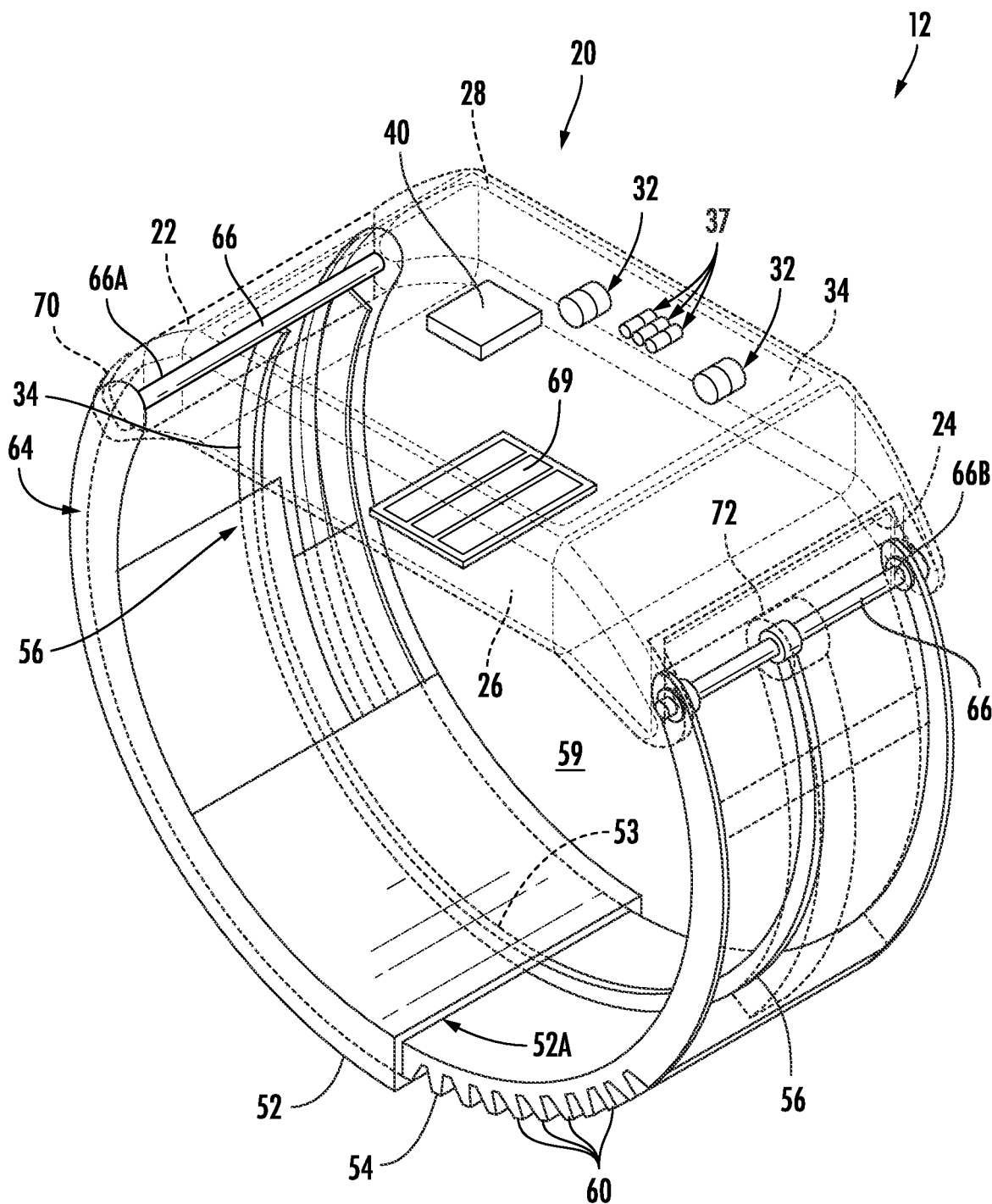
FIG. 7 is a perspective view of an interior schematic of the device according to one or more embodiments of the presently disclosed subject matter.

Turning to FIGS. 3 and 7, the main body 20 may house a number of components, such as one or more sensors for sensing conditions. Sensors of the device may include one or more of any of the following: accelerometer 48 for sensing motion or acceleration (e.g., a piezoelectric accelerometer), a microphone 45 for sensing audio, a pressure sensor or piezoelectric crystals for sensing pressure, a location sensor (which may be a GPS transmitter), or any other sensor configured to detect a condition of the user or the environment in which the user is located. In one embodiment, the microphone 45 may capture audio sensed conditions and the computer module 40 and/or remote computers 14 may perform analytics on the audio to identify gunshots, verbal threats or other notable audio events. Noise cancellation functions can be applied to the audio once captured or may be applied to the initial capture of sensed conditions through the microphone components itself. The sensors 46 of the device 12 may detect vibration and/or acceleration using an accelerometer 48 or other sensors 46. The sensed conditions may be analyzed to identify punches or defense of punches or other violent acts.

The main body 20 may further house a battery 36 for powering the display 30, sensor(s) and/or a computing module 40. The battery 36 may be rechargeable and may be charged wirelessly or by using an electrical connection. The main body 20 may include one or more connection pins (or ports) 37 for charging the battery 36 and/or permitting data transfers through an electrical connection, such as software updates or installations, as well as stored conditions, analytics and other data. The port 37 may be a Universal Serial Bus (USB) port, such as USB-C. The pin(s) or port(s) 37 may be in electrical communication with the battery 36. In some embodiments, as is depicted in the following FIGS. 11-13, the battery 36 may include one or more coils 39, such as, for example, side coil 39S or bottom coil 39B, for receiving a wireless energy transfer. The wireless energy transfer may be received from a charging system 100. The battery 36 may be housed in a metal shield for shielding the respective coil 39 from electro-magnetic interference or noise, the metal shield having an open side for permitting communication between the battery 36 and any transmitter. The open side of the coil 39S may be positioned parallel, proximal to and/or coextensive with a side surface 34 of the main body 20.

Figure 10:
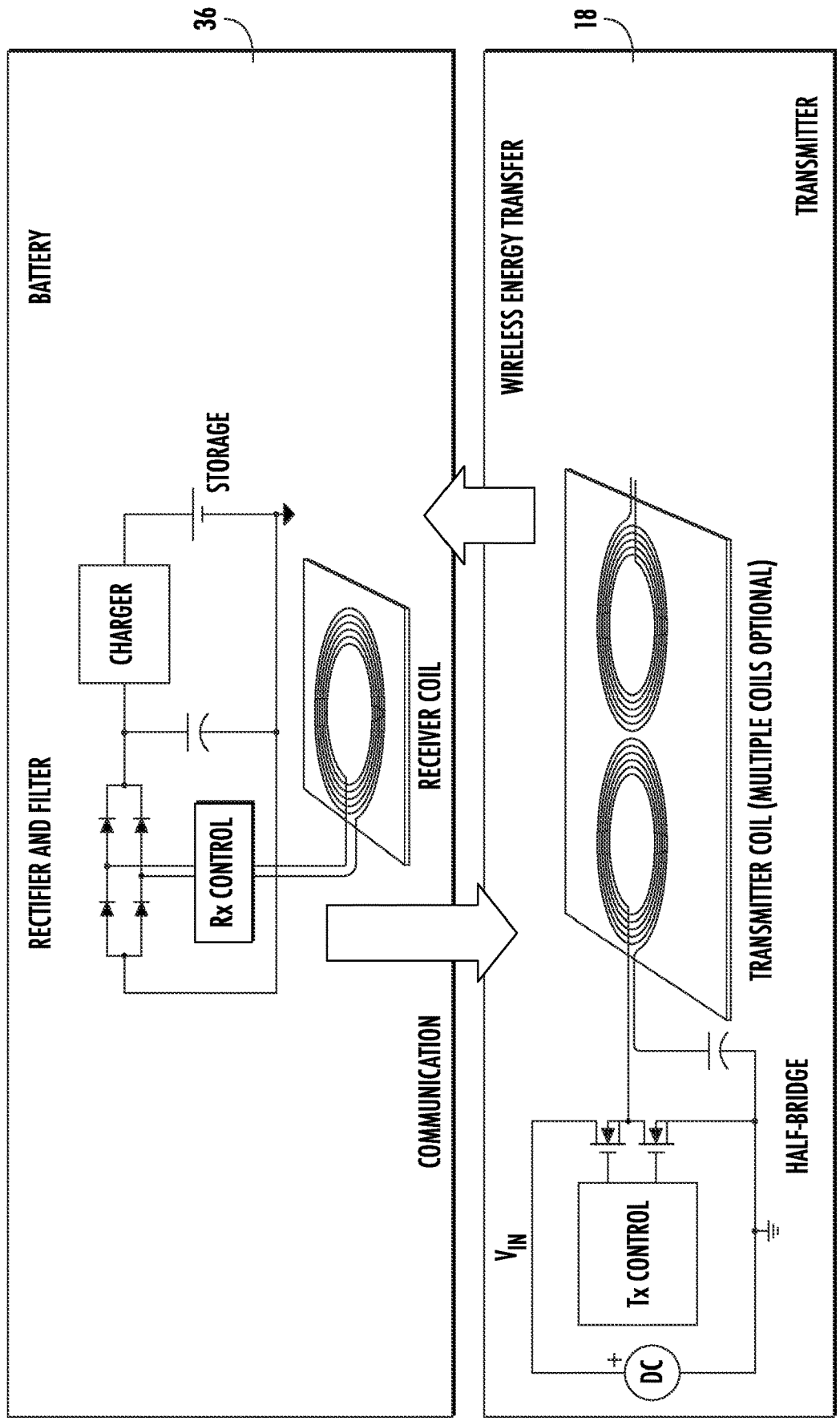
FIG. 10 is a schematic of a battery and transmitter according to one or more embodiments of the presently disclosed subject matter.

According to some embodiments of the invention, the device 12 further includes at least one magnet 32 for aligning the device 12 with a transmitter 18 (the transmitter 18, represented in FIG. 10, being a device or connection between devices configured to transmit power to the battery 36 and/or communicate with the device 12 for the exchange of data). The transmitter 18 may be included in the charging system 100. The at least one magnet 32 may be positioned on the side surface 34. In some embodiments, at least two magnets 32 may be positioned along the same side surface 34, and a coil 39 may be positioned between the two of the at least two magnets 32. In this manner, a transmitter 18 may include correspondingly positioned magnets, thereby allowing the device 12 and the device 16 or transmitter 18 to align with each other for effective communication. For example, such a configuration may permit the transmitter coil of the transmitter 18 to align with the receiver coil 39 of the battery 36. In another example, where the main body 20 further includes pins 37 for electrical communication, the magnet(s) 32 of the device 12 may permit alignment with the transmitter 18 for aligning the pins 37 with corresponding electrical connections of the transmitter 18.

According to at least one embodiment, the main body 20 may define a male or female shape along the side surface 34 for corresponding to, and nestingly engaging with, a complementary female or male shape of the transmitter 18. In such an embodiment, only one magnet 32 may be included by the main body 20 for aligning the device 12 and the transmitter 18. The security system 10 may include a transmitter 18 or may be configured to communicate with a third-party transmitter 18. The battery (or batteries) 36 and/or pin(s) 37 may be positioned along the one or more side surfaces 34, the first end 22, second end 24, interior surface 26 and/or exterior surface 28. Further the battery (or batteries) 36 and/or pin(s) 37 may be positioned proximal the magnet(s) 32. One embodiment, including two magnets 32 and three pins 37 is depicted in the FIG. 4 schematic.

Figure 4:
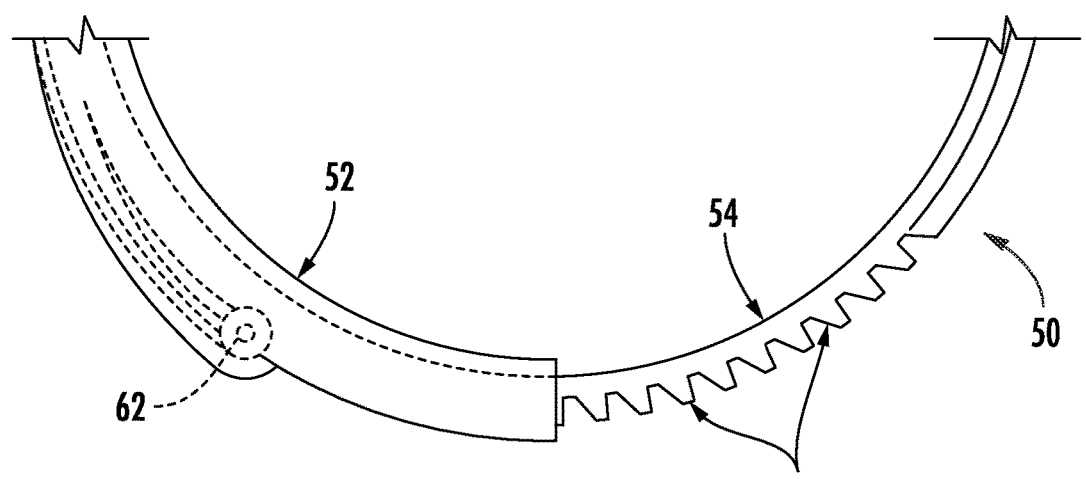
FIG. 4 is a side view of a male portion defining a plurality of teeth engaged with a female portion according to one or more embodiments of the presently disclosed subject matter.
Figure 18:
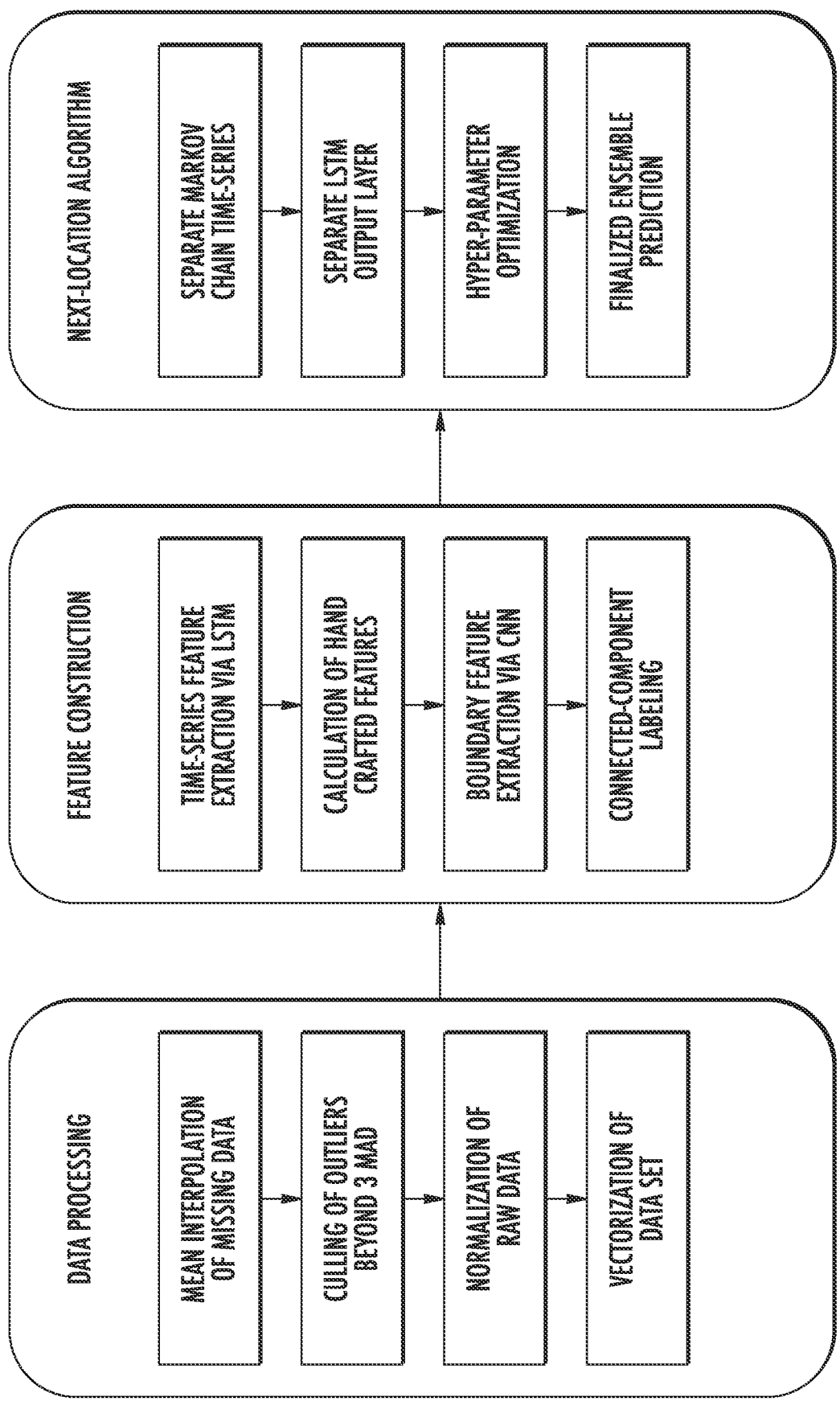
FIG. 18 is a flow diagram of analytics process according to one or more embodiments of the presently disclosed subject matter.

Though FIG. 4 does not depict the electrical connection between the pins 37 and the computing module 40, one skilled in the art could certainly envision and quickly establish such connection. The computing module 40 may include a processor 42 and/or memory 44 for storing and/or analyzing the sensed conditions or the received data, and/or communicating with the remote computer 14, other computing devices 16, and/or a transmitter 18. For example, the accelerometer 48 may sense conditions, such as accelerations, which may be stored within the memory 44 and analyzed by software and logic of the processor 42 to determine if such accelerations indicate a traumatic force or simply a playful gesture. The processor 42 may also be configured with software to transmit sensed conditions or analytics from the device 12. The device 12 may transmit the sensed conditions or analytics through the pins 37 electrically, or through a wireless transmitter to a wireless receiver or may contain an internal subscriber identity module or subscriber identification module (SIM) 69 for further processing or storage by a third party or by the security system 10 using a remote computer 14 and/or other computing devices 16 and/or transmitters 18. The SIM 69 may include the processor 42 and/or memory 44 and/or transmitter 18. The sensed conditions or analytics may be processed to perform analytics, develop metrics and statistics, enabling predictive insights. FIG. 18 is a flow diagram of analytics process according to one or more embodiments of the presently disclosed subject matter.

The security system 10 may include any number of wireless communication setups to enable wireless transmission between a device 12 and/or the charger 102 and a remote computer 14 and/or other computing devices 16 and/or transmitters 18, such as one included in the charging system 100. The transmissions may be encrypted using any number of cryptographic or other encryption techniques, including but not limited to frequency hopping, time shifting, rotating key encryption and/or other private/public key encryption methods. For example, some encryption methods may only prevent decryption for very short periods of time, but such time may be longer than is needed for the transmissions to be acted upon, and therefore the encryption is effective to prevent an abuser team from reacting to such transmissions in real-time. One embodiment of the transmission mechanism is depicted in FIG. 10.

Figure 8:
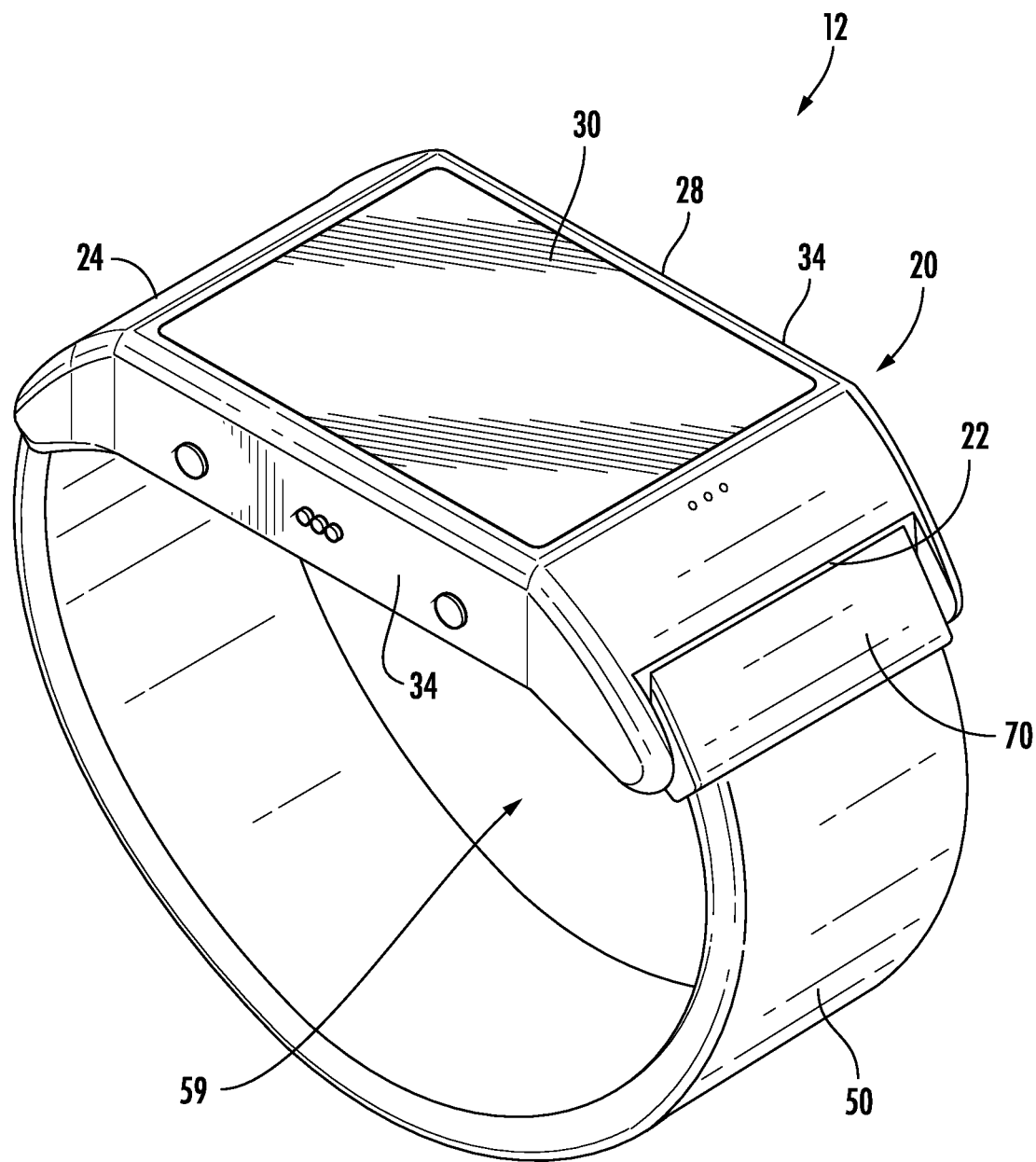
FIG. 8 is a perspective view of the device according to one or more embodiments of the presently disclosed subject matter.
Figure 9:
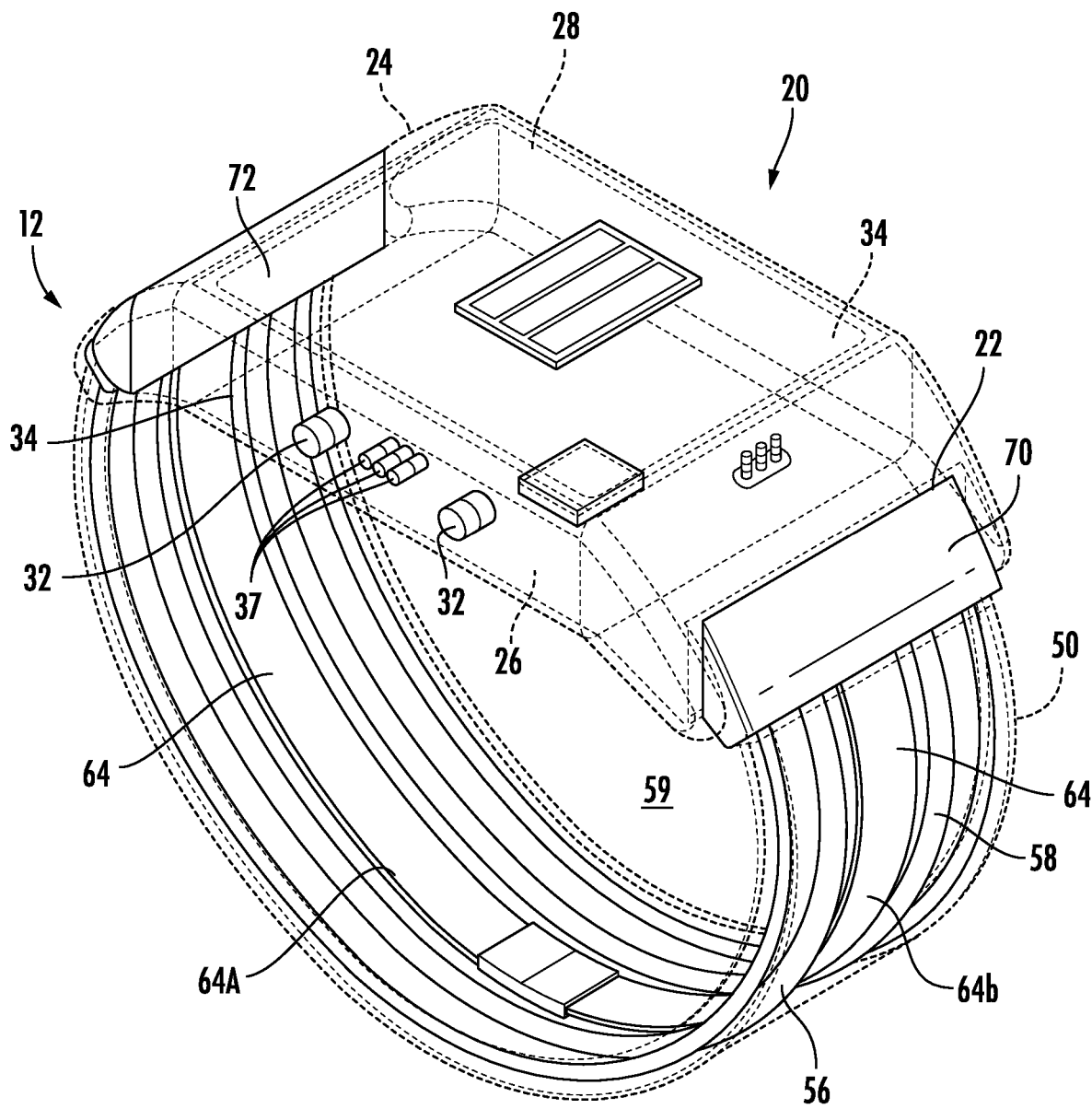
FIG. 9 is a perspective view of an interior schematic of the device according to one or more embodiments of the presently disclosed subject matter.

As disclosed in brief above, and as depicted in FIGS. 8 and 9, the device 12 may include a main body 20 and a band 50. The band 50 may be coupled to the main body 20 and extend from the first end 22 to the second end 24 for substantially creating a loop. A void 59 may be defined by the band 50 and the interior surface 26 of the main body for accepting the limb of a user 1 therethrough. In some embodiments, the device 12 may be worn about a wrist or arm, while in other embodiments the device 12 may be worn about an ankle or leg. The main body 20 and the band 50 may be coupled together using any number of fasteners. In one embodiment, a first bar 66A may extend through the band 50 for coupling to the first end 22 of the main body 20 and a second bar 66B may extend through the band 50 for coupling to the second end 24 of the main body 20. The bars 66 may be unitarily constructed as part of the ends 22, 24 or may be fastened thereto.

Figure 11:
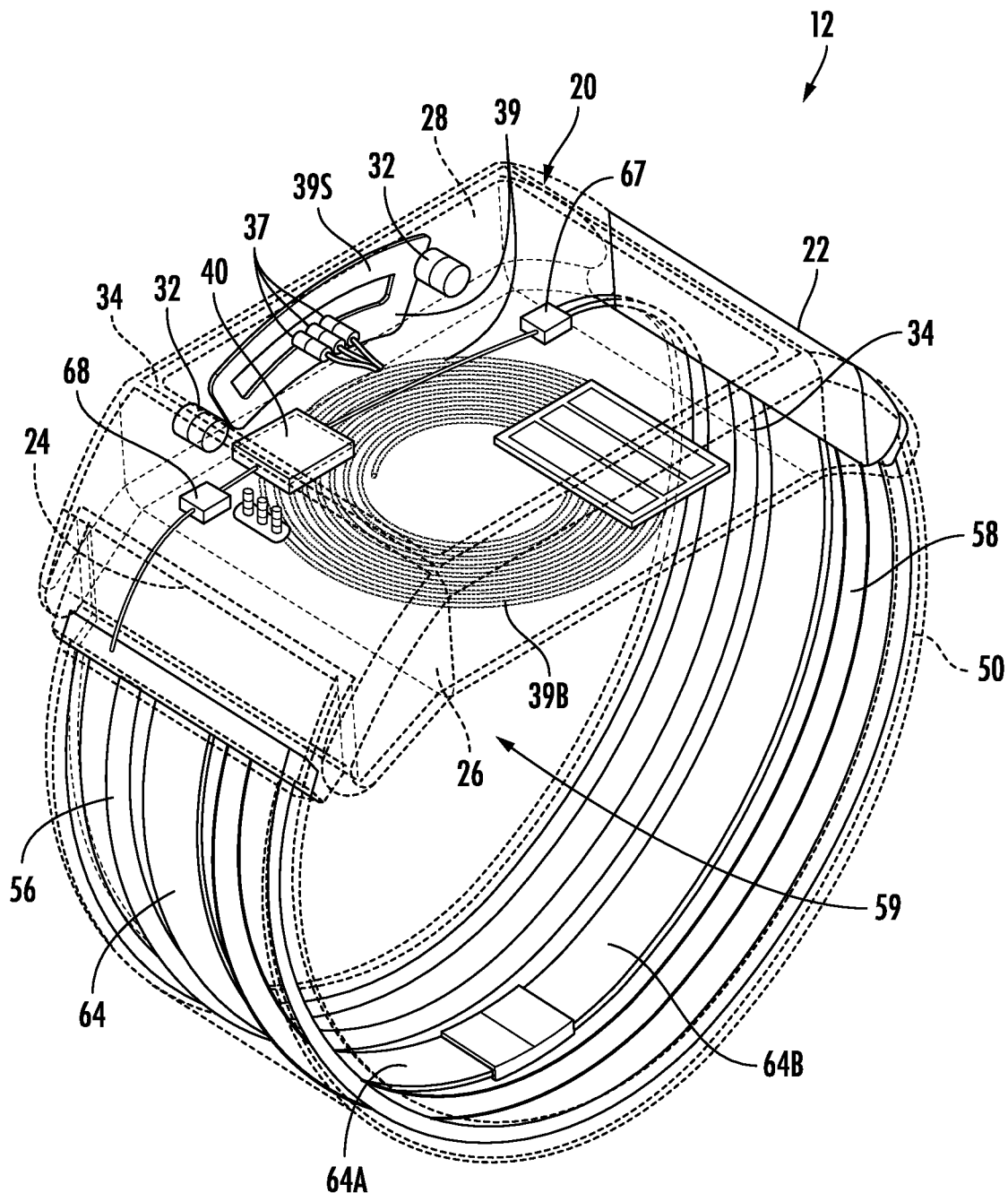
FIG. 11 is a perspective view of an interior schematic of the device according to one or more embodiments of the presently disclosed subject matter.

The band 50 may house a tamper-avoidance cable 56 embedded therein and extending a length of the band 50, from first end 22 to second end 24. The cable 56 may be a tensile-strength and/or fiber optic cable. As shown in FIG. 11, in some embodiments, the computing module 40 of the main body 20 may be in communication with an emitter 67 for emitting a signal through the cable 56, for example, when cable 56 is a fiber optic cable. The module 40 may further be in communication with a detector 68 for sensing signals that may have been emitted through the cable 56. In some embodiments, the emitter 67 may be periodically pulsed, and the detector 68 may be periodically sampled. The sampled signal may be compared to a reference signal. When the band 50 is bent or broken, the amount of signal that may be received by the detector 68 is attenuated and the sampled signal drops below the reference signal, thus indicating a potential tampering of the device 12. The emitter 67 and/or detector 68 may be housed within the main body 20.

The band 50 may include a female portion 52 and a male portion 54. The female portion 52 may have both a width and height greater than a width and height of the male portion 54 and may further define a cavity 52A for accepting the male portion 54 therein. With such a configuration, the male portion 54 may be translated within the female portion 52 for engaging a locking mechanism between the two portions 52, 54 for preventing the male portion 54 from being disengaged from the female portion 52 by the user 1, without specialized tools. In one embodiment of the invention, the male portion 54 defines a plurality of teeth 60 and the female portion includes one or more clasps 62 for engaging at least one of the plurality of teeth 60, as is depicted in FIGS. 4, 5 and 6.

Figure 5:
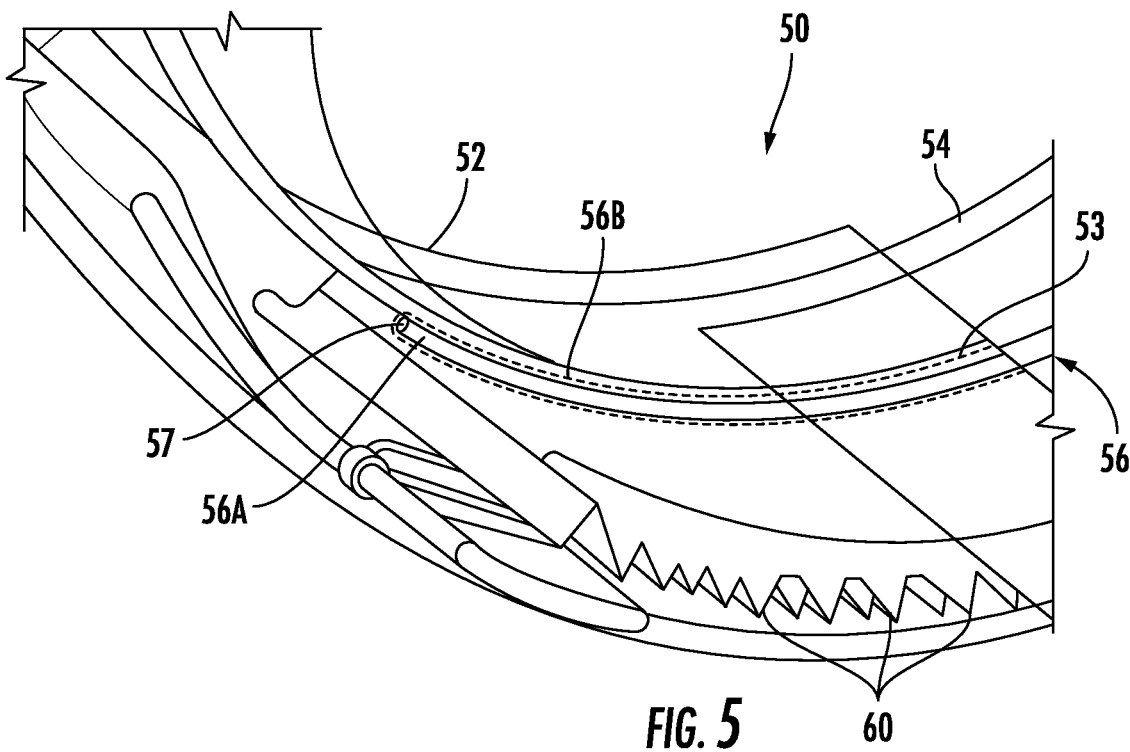
FIG. 5 is a perspective view of the device including two cables according to one or more embodiments of the presently disclosed subject matter.
Figure 6:
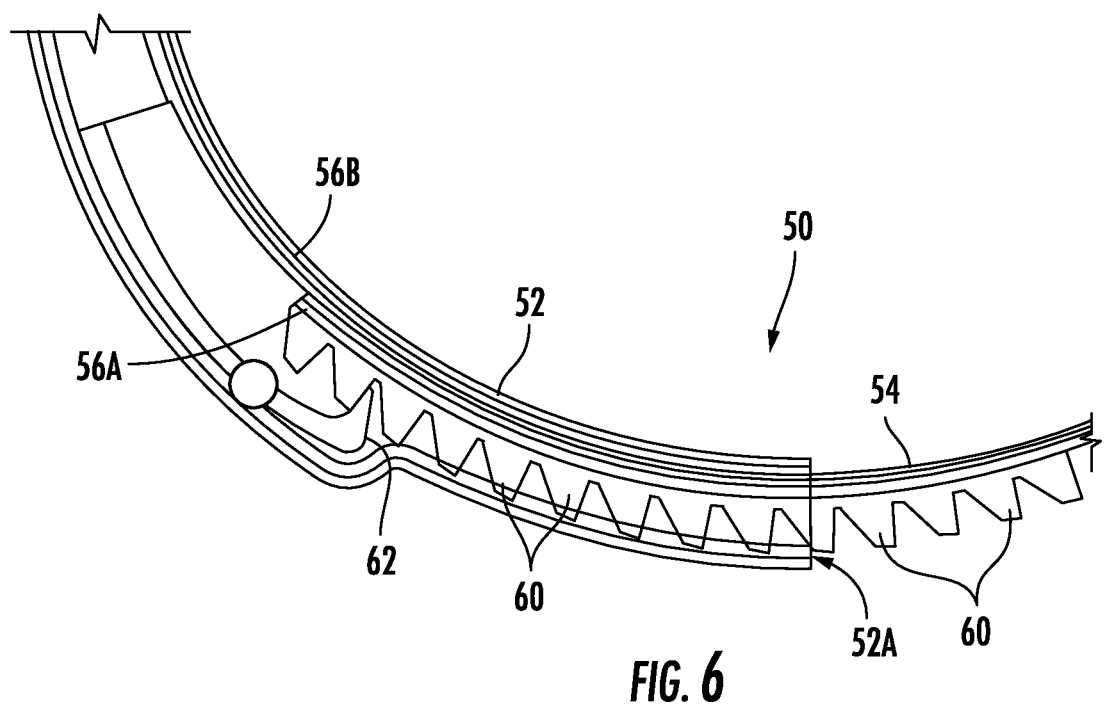
FIG. 6 is a side view of the device including two cables according to one or more embodiments of the presently disclosed subject matter.

According to one embodiment of the invention, as depicted in FIGS. 5 and 6, the tamper-avoidance cable 56 may be coupled with the main body 20, extend through the first or second end 22, 24, extend through the male portion 54, and extend from the male portion 54 a distance (this final portion of the cable 56 being the free end 57). When translating the male portion 54 within the female portion 52, the free end 57 of the tamper cable 56 may slide along a groove 53 defined within the female 52, eventually extending from an end of the female portion 52 proximal the main body 20. The free end 57 may then be clipped so at to extend adjacent or proximal to the main body 20. A tamper cable cap may then be coupled to the tamper cable 56 and the main body 20 for coupling the tamper-avoidance cable 56 to the main body 20 with minimal slack. In such a configuration, the tamper-avoidance cable 56 would thus extend between the first and second ends 22, 24 of the main body 20.

In some embodiments, the tamper-avoidance cable 56 further extends through the entire main body 20, from first end 22 to second end 24. Alternatively, a second tamper-avoidance cable 56B extends across the entire main body 20, from first end 22 to second end 24.

In FIGS. 6 and 7, two tamper-avoidance cables 56 are depicted, a first cable 56A extending along the female portion 52 and overlapping with the second cable 56B extending along the male portion 54. In this manner, the entire male and female portions 52, 54 are covered in length by the tamper-avoidance cables 56. FIG. 8 offers a holistic view of one embodiment of the invention.

In other embodiments, as seen in FIGS. 9 and 11, a security cable 58 may also be included within the band 50 of the device 12. The security cable 58 may extend from the main body 20, or from the bar 66, along the entire length of the male portion 54.

In yet other embodiments, a metallic strip 64 may be embedded within the band 50 along its entire length. For example, as depicted in FIGS. 9 and 11, the strip 64 may extend through the entire length of band 50. In other embodiments, the strip 64 may extend through the entire length of the male portion 54 and the female portion 52 and each of these male and female sections of the strip 64 may contact each other when the male portion 54 is translated within the female portion 52. Further, the strip 64, through the first and second ends 22, 24 of the main body 20, may be in electrical communication with the computer module 40 for detecting any distorting/destructive forces creating electrical interference or damage along the strip 64. The contact between the male portion 54 and the female portion 52 for the strip 64 may be two metal contacts that slide in frictional contact against each other as the male portion 54 is translated within the female portion 52, and further are coupled to the strip 64. In other embodiments, the strip may include a first strip 64A and a second strip 64B that connect to each other.

In yet another embodiment, the strip 64 is comprised of foil for twist detection, such that the connection between the first strip 64A and second strip 64B is broken if the band 50 is twisted beyond a tolerance. For sizing to the particular user 1, the band 50 may be cut to size on each of its ends, coupled to the first connection 70 and second connection 72, then these connections 70, 72 may be coupled to the first end 22 and second end 24.

The security system 10 may collect and process data, including sensed conditions and analytics. Location data has become ubiquitous with the advent of modern geo-location technology used in cellphones and navigation systems in vehicles. Through the use of machine learning it could be possible to develop algorithms to predict patterns in movement to understand where a mobile user or vehicle is likely to go next based on their current location and previous location history, such as predicting where a user 1 (or wearer of the device 12) is going and would likely go next based on their previous behavior.

Location data may be collected from the device 12, including but not limited to: GPS coordinates, router and network information such as subnet, IP, gateway, MAC address, connected devices, WFPS, and Bluetooth beacons. Additional demographic data and contextual data may be compiled through third party sources (such as from public record and third-party data services), or may be manually entered, such as: name, age, criminal record, places of business, restaurants, parks, attractions, neighborhoods and more. These data may be stored in both a relational and time-series structure in order to build a history of behavior for users 1.

Relative location calculations may be performed by the security system 10 for determining when a wearable device 12 is within a certain distance of a particular victim or third party by also utilizing the victim or third party's locational information. The device 12 may also include or be in communication with other computing devices 16 which sense biofeedback signals, such as pulse temperature, and other biofeedback signals, in order to identify fear, anxiety, stress, pain or pathological conditions such as seizures.

Data may be used in both an aggregate structure to understand the behavior of general users 1 and at an individual level to understand the behavior of a specific user 1. Data may be cleaned, missing data will be interpolated, masked, or otherwise statistically accounted for. Outliers, corrupted data, and other interference may be either masked, removed, or statistically moderated. For the general-purpose algorithm, data may be standardized and normalized across users 1 to account for outliers and variance in the data. Data for individual user 1 models may have additional user specific pre-processing, based on the variance and statistical distribution of the user's specific data.

After data has been processed, valuable features in the data may be extracted that may be used to predict next location. Machine learning techniques including but not limited to convolutional neural networks and long short-term memory neural networks may be used. A combination of Markov chain time-series methods and a deep neural network approach to predict the next location of users may be used. The Markov chain approach typically excels in environments when data is sparse or limited (e.g., early in commercialization). The deep learning, neural network approach typically excels once data is rich and available (e.g., later in commercialization).

The delivery of the predicted output and the current location of users 1 in the security system 10 will be given via an intelligent display dashboard to government officials and law enforcement. They will be able to view forecasted paths of users 1, potential intersections that could cause conflicts, and set alerts for intersections and locations, both current and forecasted that would be of interest/issue. One embodiment of the system's data analysis is schematically represented in FIG. 9.

Figure 12:
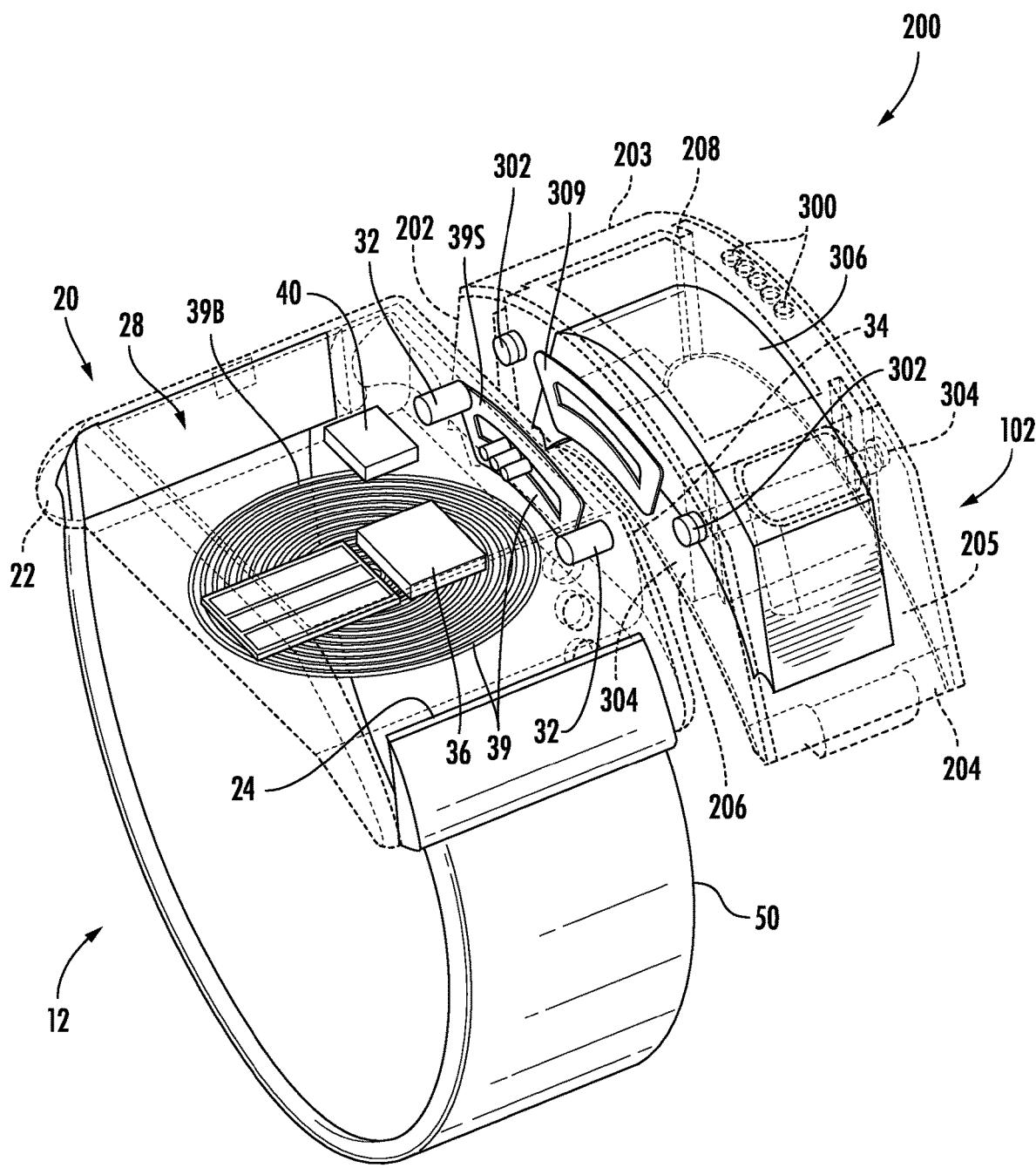
FIG. 12 is a perspective view of an interior schematic of the device and charger according to one or more embodiments of the presently disclosed subject matter.

A charging system 100 of the present invention may include a wearable charger 102, a charging station 106, and/or a charging connection. The wearable charger 102, the charging station 106, and/or a charging connection may be configured to communicate with each other using any methods know in the prior art and/or disclosed herewithin, including electrical or wireless communications. The charger 102 may be worn by the user 1 for charging the device 12 being worn by the user 1, or another device. For example, in at least one embodiment of the invention, as is depicted in FIG. 12. the user 1 may be wearing the device 12 and the charger 102 may be positioned proximal the device 12 for charging while being worn with minimal obstruction to the user's movements or actions.

Figure 13:
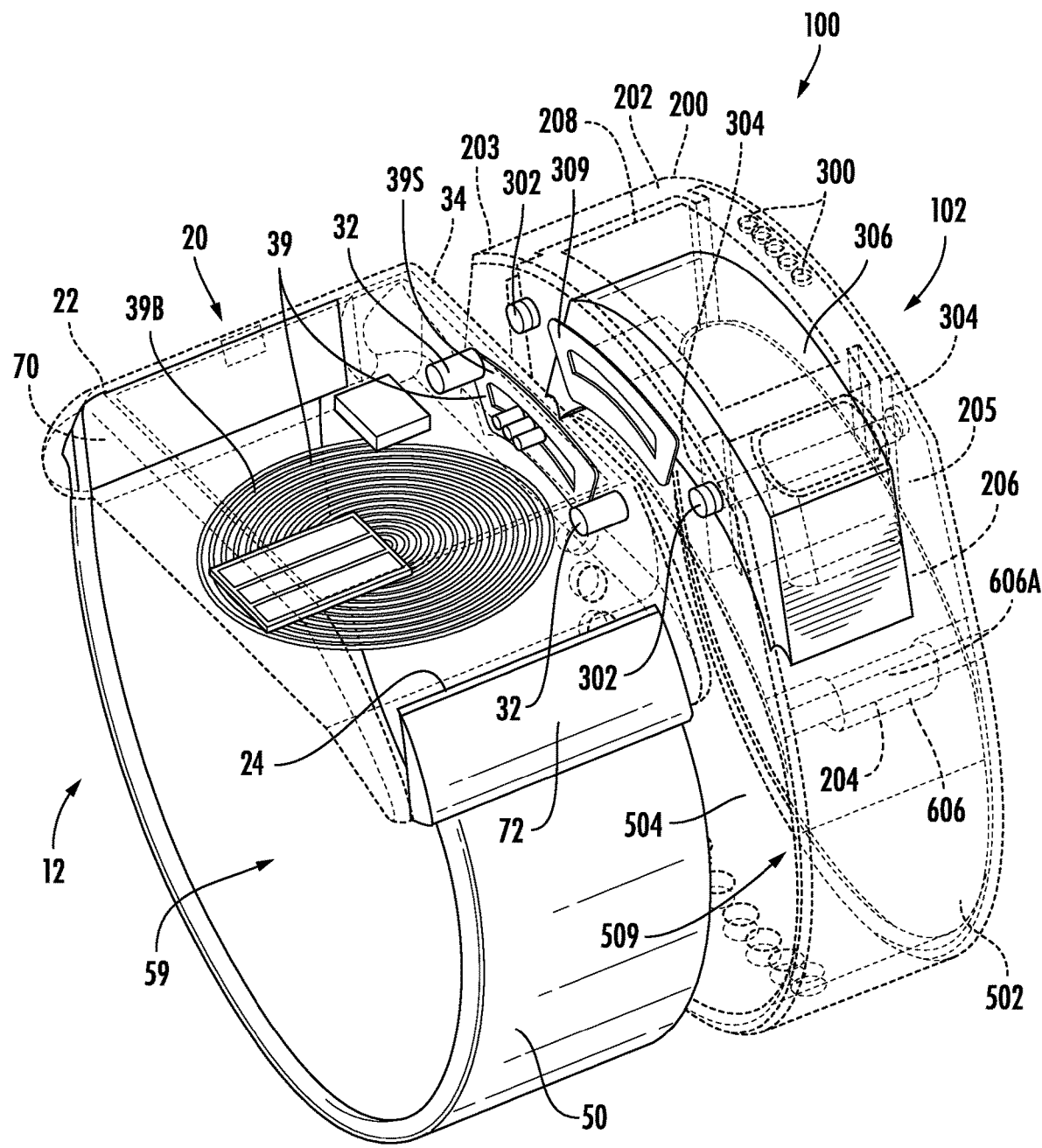
FIG. 13 is a perspective view of an interior schematic of the device and charger according to one or more embodiments of the presently disclosed subject matter.
Figure 14:
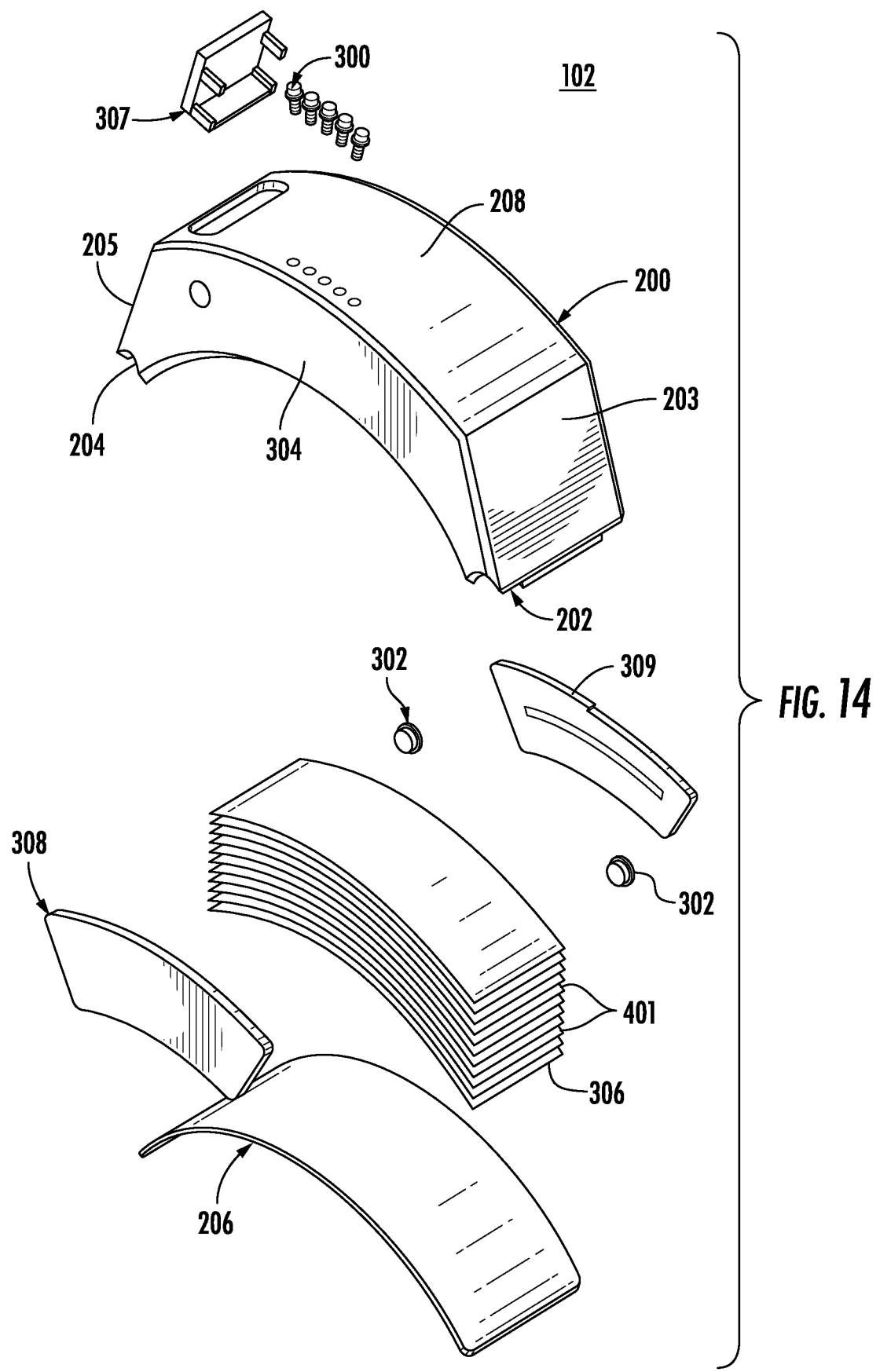
FIG. 14 is an exploded view of the main body of the charger according to one or more embodiments of the presently disclosed subject matter.
Figure 15:
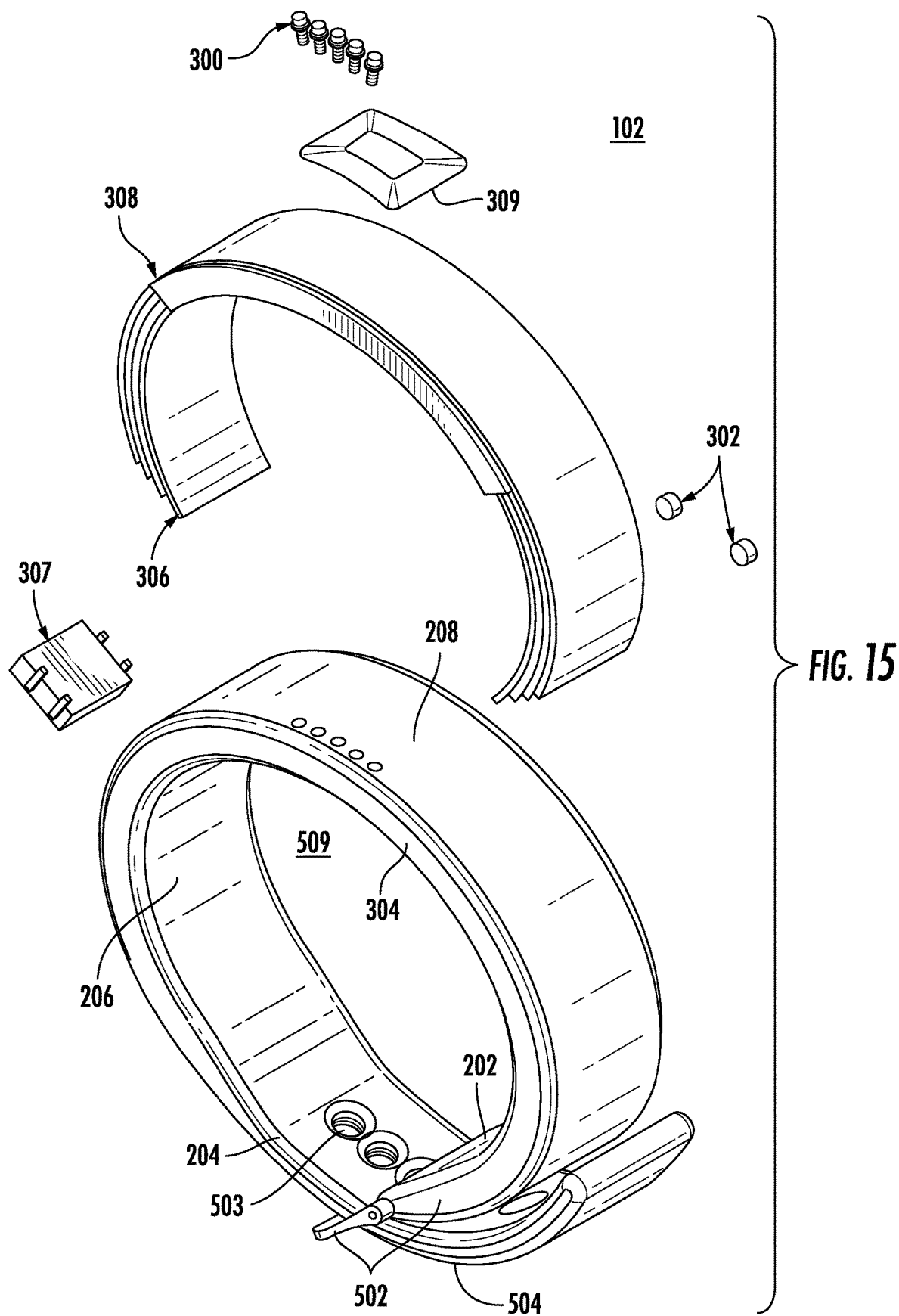
FIG. 15 is an exploded view of the charger according to one or more embodiments of the presently disclosed subject matter.

In some embodiments, as is depicted in FIG. 13, the charger 102 includes a main body 200 coupled to a male band 504 and a female band 502. The main body 200 may define a first end 202 opposite a second end 204, an interior surface 206 opposite an exterior surface 208, wherein the surfaces 206, 208 extend between the first end 202 and the second end 204. Further, the main body 200 may define at least one side 304 extending between the two ends 202, 204 and the two surfaces 206, 208. In some embodiments, the main body 200 includes a first end surface 203 and a second end surface 205, as is depicted in FIG. 14. FIG. 15 depicts an embodiment without these surfaces 203, 205.

The main body 200 may include a display 300 for displaying information. The display 300 may also include one or more inputs for receiving commands from the user 1. The input(s) may be a button, haptic surface, or some other tactile feature. The display 300 may be positioned on the exterior surface 208 or a side surface 304 for viewing by the user 1. The display 300 may include one or more light indications for displaying the power stored in a battery (or batteries) 306 of the charger. The light indications may be light emitting diodes.

The main body 200 may house a number of components, such as one or more batteries 306 for powering the display 300, a protection circuit module 308, and/or charging the device 12 or another device. The battery 306 may be rechargeable and may be charged wirelessly or by using an electrical connection. The protection circuit module 308 may be positioned substantially parallel and adjacent to any of the surfaces 203, 205, 206, 208, 304. The module 308 may include flexible circuitry. The protection circuit module 308 can monitor and control electrical and/or wireless communications to and from the at least one battery 306. The main body 200 may include one or more connection pins or ports 307 for charging the battery 306 electrically and/or permitting data transfers, such as software updates and installations. The pin(s) or port(s) 307 may be in electrical communication with the battery 306. The port 307 may be a Universal Serial Bus (USB) port, such as USB-C.

The battery 306 may include a plurality of battery units 401, arranged side-by-side and distributed laterally, substantially parallel and stacked, or both. In one embodiment, the battery 306 has a 575 mAh capacity. The battery 306 may be flexible, such as a flexible zinc-carbon or lithium polymer battery or some other flexible structure of galvanic cells, whether using polymer binders, cables, or some other flexible matrix.

In some embodiments, the battery 306 may be in electrical communication with a coil transmitter 309 for transferring a wireless energy to a wireless receiving coil of a battery of the device 12 or another device. The coil transmitter 309 may be housed in a metal shield for shielding the coil 309 from electro-magnetic interference or noise, the metal shield having an open side for permitting communication between the coil transmitter 309 and the receiving coil of the device 12 or another device. The open side may be positioned parallel, proximal to and/or coextensive with an exterior surface 208, interior surface 206 or side surface 304 of the main body 200.

Figure 16:
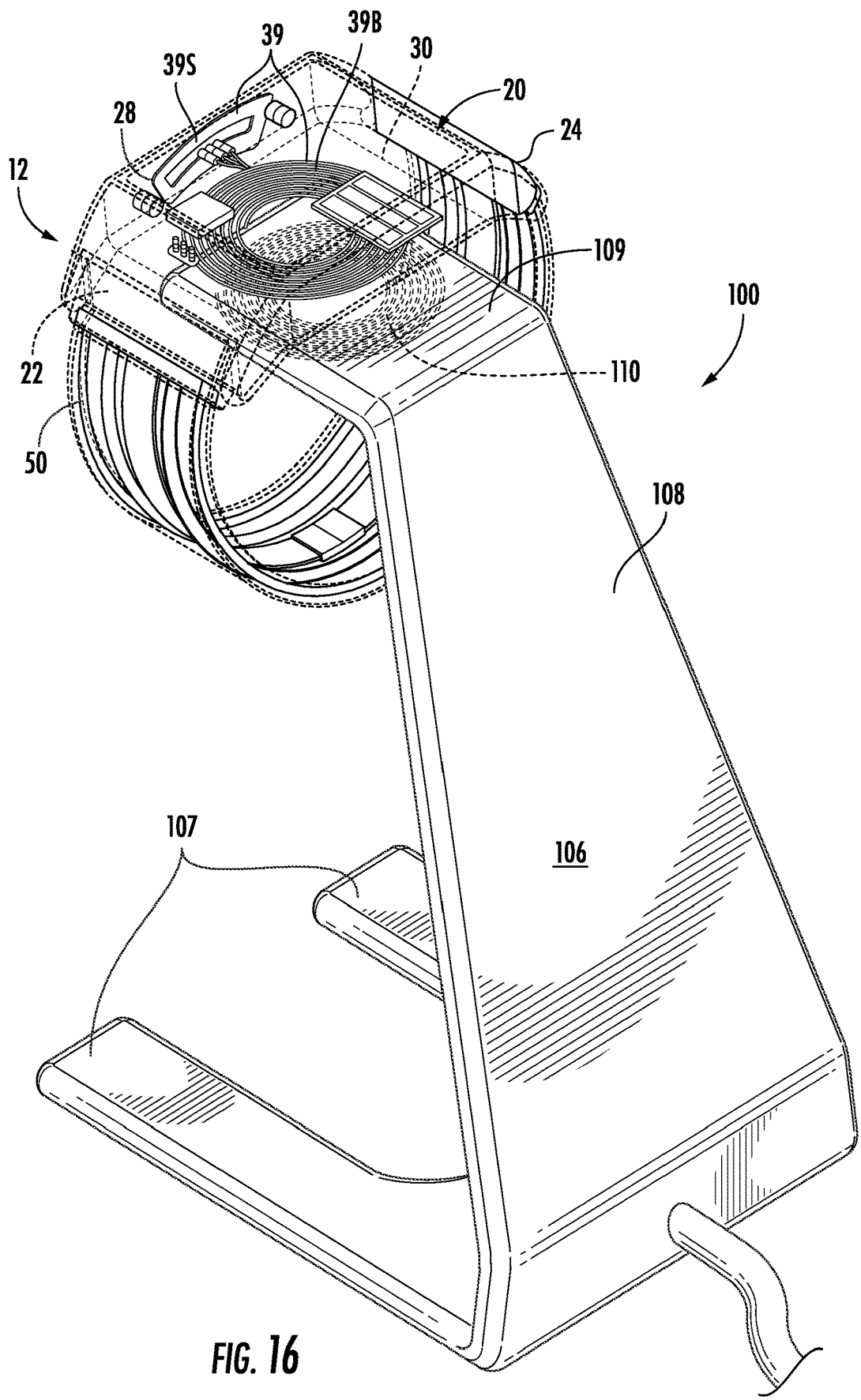
FIG. 16 is a perspective view of an interior schematic of the device on the charging station according to one or more embodiments of the invention.
Figure 17:
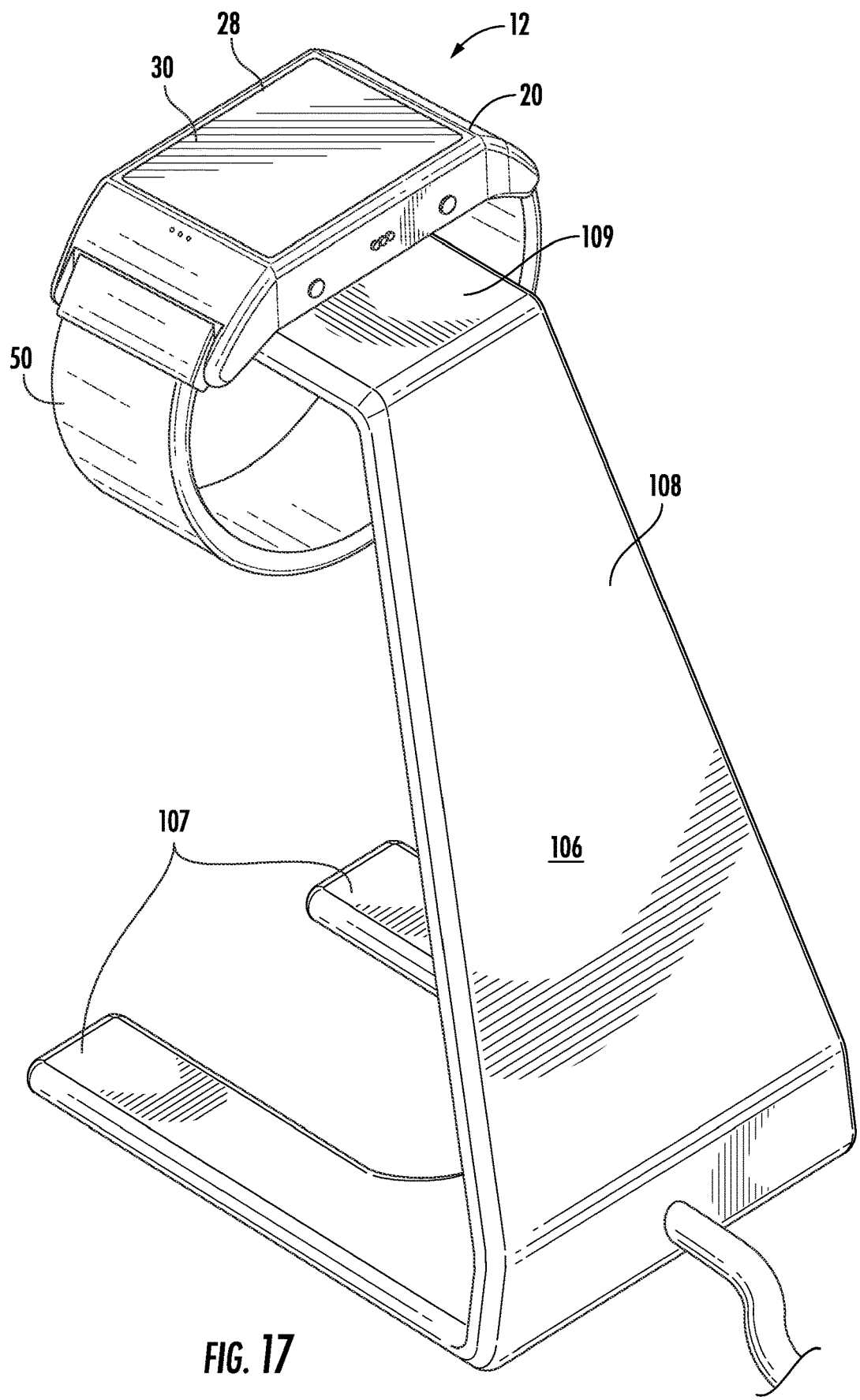
FIG. 17 is a perspective view of the device on the charging station according to one or more embodiments of the invention.

In a similar fashion, the coil transmitter 309 may also serve the function of a receiving coil when the device 12, or another device, is placed upon the charging station 106 (for example, see FIGS. 16 and 17). The charging station 106 may include a coil transmitter of its own for wirelessly transmitting energy to the coil 309 of the charger 102 or the device 12. Like the charger 102, the charging station 106 may include a metal shield and may further include a power source for connecting to a power supply. The charger 102 may include multiple transmitting coils 309, each positioned substantially parallel and proximal to a corresponding surface 203, 205, 206, 208, 304 for transmitting and/or receiving energy from the device 12, another device and/or the charging station 106. In some embodiments, the charging station 106 electrically communicates with the charger 102 via a charging connection, such as a USB cord, electrical connection or another charging station.

According to some embodiments of the invention, the charger 102 further includes at least one magnet 302 for aligning the charger 102 with the device 12, another device, a charging connection, and/or the charging station 106. The at least one magnet 302 may be positioned on one or more of the surfaces 203, 205, 206, 208, 304. In some embodiments, at least two magnets 302 may be positioned along the same side surface 304, and a coil 309 may be positioned between the two of the at least two magnets 302. In this manner, the device 12, another device, a charging connection, and/or the charging station 106 may include correspondingly positioned magnets, thereby allowing the charger 102 to align for effective communication of charging energy. For example, such a configuration may permit the coil of the device 12, another device, the charging connection, and/or the charging station 106 to align with the coil 309 of the charger 102. In another example, where the main body 200 further includes pins 307 for electrical communication, the magnet(s) 302 of the charger 102 may permit alignment with the device 12, another device, a charging connection, and/or the charging station 106 for aligning the pins 307 with corresponding electrical connections of the device 12, another device, a charging connection, and/or the charging station 106.

According to at least one embodiment, the main body 200 may define a male or female shape along the surface 203, 205, 206, 208, 304 on which at least one magnet 302 is position for corresponding to, and nestingly engaging with, a complementary female or male shape of the device 12, another device, a charging connection, and/or the charging station 106. In such an embodiment, only one magnet 302 may be included by the main body 200 for aligning the charger 102 and the device 12, another device, a charging connection, and/or the charging station 106. The charging system 100 may include another device, a charging connection, and/or the charging station 106 or may be configured to communicate with any or all of these elements. The battery (or batteries) 306 and/or pin(s) 307 may be positioned along the one or more side surfaces 304, the first end 202, second end 204, interior surface 206 and/or exterior surface 208. Further the battery (or batteries) 306 and/or pin(s) 307 may be positioned proximal the magnet(s) 302.

As disclosed in brief above, the charger 102 may include a main body 200, a male band 504 and a female band 502. The bands 502, 504 may be coupled to the main body 200 and extend from the first end 202 to the second end 204 for substantially creating a loop when the female band 502 and male band 504 are engaged. For example, the male band 502 can include a buckle that can engage apertures 503 in the female band 504. A void 509 may be defined by the bands 502, 504 and the interior surface 206 of the main body for accepting the limb of a user 1 therethrough. In some embodiments, the charger 102 may be worn about a wrist or arm, while in other embodiments the charger 102 may be worn about an ankle or leg. The main body 200 and the bands 502, 504 may be coupled together using any number of fasteners. In one embodiment, a first bar 606A may extend through the male band 504 for coupling to the first end 202 of the main body 200 and a second bar (not shown) may extend through the female band 502 for coupling to the second end 204 of the main body 200. The bars 606 may be unitarily constructed as part of the ends 202, 204 or may be fastened thereto.

The charging station 106 may include two or more feet 107 extending from a tower 108, from which a platform 109 extends. Power may be provided to the charging station 106 through an electrical connection. The platform 109 may house a transmission charging coil 110 for wirelessly charging the device 12, charger 102, another device or another charger. Both wireless and passive charging mechanisms may be employed.

One advantage of the present invention is extending the time a user 1 may use the device 12 or another device without having to remove the device 12 or another device for charging. For example, the device 12 or another device may be charged using the charging station 106 and then worn by the user 1. The charger 102 may later be worn by the user 1, adjacent to the device 12 or another device, for continually charging and replenishing the battery of the device 12 or another device. In this later charging, the side coil 39S of the device 12 may be utilized, whereas the charging station utilizes the bottom coil 39B.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A security system comprising: a wearable security device comprising: a main body defining a first end opposite a second end, an interior surface opposite an exterior surface and both extending between the first end and the second end; a display positioned on the exterior surface; at least one magnet positioned on a side surface extending between the first end, the second end, the interior surface and the exterior surface; at least one battery positioned proximal the at least one magnet and housed within the main body; a side coil in operable communication with the battery and positioned proximal the side surface on which the at least one magnet is positioned, the side coil for receiving a wireless energy transfer to recharge the battery; a computing module housed within the main body, wherein the computing module includes a processor and memory; a band configured to extend from the first end to the second end for defining a void between the interior surface and the band; a tensile-strength and/or fiber optic cable and/or delicate breakable metal circuitry housed within the band and extending across an entire length of the band; and a charger comprising: a charger main body defining a first charger end opposite a second charger end, an interior charger surface opposite an exterior charger surface and both extending between the first charger end and the second charger end, and one or more side charger surfaces extending between the first charger end, the second charger end, the interior charger surface and the exterior charger surface; a charger display positioned on one of the charger surfaces of the charger main body; at least one charger magnet positioned on least one of the one or more charger side surfaces of the charger main body; at least one charger battery positioned within the charger main body; a power transmission coil for wirelessly powering the device, the power transmission coil being parallel to one of the one or more charger side surfaces so that the power transmission coil is configured to be alignable with the side coil of the wearable security device to transfer a wireless energy from the charger through the power transmission coil and the side coil to the battery of the wearable security device to recharge the battery of the wearable security device.

2. The system of claim 1, wherein the device further includes: a plurality of teeth defined by a male portion of the band; at least one clasp included within the female portion and configured to engage at least one of the teeth.

3. The system of claim 2, wherein the tensile-strength and/or fiber optic cable comprises a tensile-strength cable and a fiber optic cable with the tensile strength cable further comprising a first cable and a second cable.

4. The system of claim 1, further comprising an accelerometer housed within the main body and in communication with the processor.

5. The system of claim 1, further comprising a microphone housed within the main body and in communication with the processor.

6. The system of claim 1, further comprising a metallic strip housed within the band and extending across the entire length of the band.

7. The system of claim 1, wherein the device is in wireless communication with one or more remote computers or computing devices.

8. The system of claim 1, wherein the charger further comprises:
a charger male band extending from the first charger end; and
a charger female band extending from the second charger end for selectively engaging with the charger male band.

9. The system of claim 1, wherein the charger display is at least two light indicators for indicating an amount of power stored in the at least one battery.

10. The system of claim 1, wherein the charger further includes a charging pin or port for accepting an electrical charge.

11. The system of claim 1, wherein the charger further includes a protection circuit module for monitoring and controlling electrical and/or wireless communications to and from the at least one battery.

12. The system of claim 1, wherein the charger is in wireless communication with one or more remote computers or computing devices.

* * * * *